(12) United States Patent
Lee et al.

(10) Patent No.: US 8,423,015 B2
(45) Date of Patent: Apr. 16, 2013

(54) RELAY SYSTEM AND METHOD FOR CELLULAR COMMUNICATION

(75) Inventors: Yeon-Woo Lee, Seongnam-si (KR); Sang-Boh Yun, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1593 days.

(21) Appl. No.: 11/451,867

(22) Filed: Jun. 13, 2006

(65) Prior Publication Data

US 2006/0281404 A1    Dec. 14, 2006

(30) Foreign Application Priority Data

Jun. 13, 2005    (KR) .................. 10-2005-0050472

(51) Int. Cl.
*H04W 40/00*    (2009.01)
(52) U.S. Cl.
USPC ....... 455/426.1; 455/450; 455/11.1; 455/451; 370/315
(58) Field of Classification Search .................. 370/328, 370/329, 331, 342, 335, 321; 455/452.2, 455/451, 450, 444, 443, 447, 464, 509
See application file for complete search history.

(56) References Cited

U.S. PATENT DOCUMENTS

| | | | |
|---|---|---|---|
| 5,214,789 A * | 5/1993 | George | 455/440 |
| 5,408,679 A | 4/1995 | Masuda | |
| 5,970,410 A | 10/1999 | Carney et al. | |
| 6,690,657 B1 | 2/2004 | Lau et al. | |
| 6,792,276 B1 | 9/2004 | Butovitsch et al. | |
| 2003/0108016 A1 | 6/2003 | Bonta | |
| 2004/0062222 A1 * | 4/2004 | Seidel et al. | 370/335 |
| 2004/0131025 A1 | 7/2004 | Dohler et al. | |
| 2007/0160014 A1 * | 7/2007 | Larsson | 370/338 |

FOREIGN PATENT DOCUMENTS

| | | |
|---|---|---|
| KR | 100245188 | 11/1999 |
| KR | 1020010111268 | 12/2001 |
| KR | 1020040016665 | 2/2004 |
| WO | WO 2004/054280 | 6/2004 |

OTHER PUBLICATIONS

Hongyi Wu et al., "Integrated Cellular and Ad Hoc Relaying Systems: iCAR", IEEE Journal on Selected Areas in Communications, vol. 19, No. 10, Oct. 2001.

* cited by examiner

*Primary Examiner* — Kamran Afshar
*Assistant Examiner* — Sayed T Zewari
(74) *Attorney, Agent, or Firm* — The Farrell Law Firm, P.C.

(57) ABSTRACT

A relay method is disclosed in a cellular communication system including an access node for providing an access service using resources of a licensed band to a particular terminal among a plurality of terminals with a partial licensed band of the full frequency spectrum, and a relay station for relaying communication between the terminal and an access node. The relay method includes performing base station-led resource allocation on a licensed band for a terminal and a relay station located in a service area of the base station, and performing relay station-led resource allocation on the licensed band and an unlicensed band for a terminal located in a service area of the relay station.

26 Claims, 6 Drawing Sheets

RELAY SYSTEM AND METHOD FOR CELLULAR COMMUNICATION

PRIORITY

This application claims the benefit under 35 U.S.C. §119 (a) of an application entitled "Relay System and Method for Cellular Communication" filed in the Korean Intellectual Property Office on Jun. 13, 2005 and assigned Serial No. 2005-50472, the contents of which are incorporated herein by reference.

BACKGROUND OF THE INVENTION

1. Field of the Invention

The present invention relates generally to wireless communication, and in particular, to a relay system and method capable of extending a service area and increasing service capacity of a licensed band (LB) system using unlicensed band (UB) resources.

2. Description of the Related Art

The development and commercialization of various wireless communication technologies requires new frequency bands that do not overlap licensed bands for the existing wireless communication technology, due to the characteristics of wireless communication based on the limited frequency resources. However, almost every frequency band has now been used.

Frequency spectra for wireless communication can be divided into licensed bands (LB) and unlicensed bands (UB). A licensed band wireless communication system (hereinafter LB system) includes an analog cellular system based on Advanced Mobile Phone Service (AMPS), a digital cellular system based on Time Division Multiple Access (TDMA), Code Division Multiple Access (CDMA) and Global System for Mobile Communications (GSM), a Digital Cordless Phones (DCT) system, and a Personal Communication Service (PCS) system, while an unlicensed band wireless communication system (hereinafter UB system) includes Bluetooth®, Wireless Local Area Network (WLAN) based on an IEEE 802.11 standard, and Wireless Metropolitan Area Network (WMAN) based on an IEEE 802.16 standard.

A plan for efficient frequency resource utilization for the next generation wireless communication is currently being discussed, and a standard for utilization of ultra-high frequency (UHF) and very high frequency (VHF) for television (TV) frequencies is now in preparation based on Cognitive Radio (CR) technology, the standard being led by IEEE 802.22 group of Institute of Electrical and Electronics Engineers (IEEE). The CR technology detects unused frequency bands that vary according to region or time, to efficiently utilize the unused frequency bands, and is aimed at efficient utilization of the frequency resources that are increasingly used.

Up to the present, however, there has been proposed no specific resource management method using the CR technology. The use of the characteristics of the UB resources can contribute to the extension of a service area of the LB system that uses the limited resources, and to an increase in the system capacity through traffic load balancing.

SUMMARY OF THE INVENTION

It is, therefore, an object of the present invention to provide a relay system and method for cellular communication, which can extend a service area and remove a shadow area of a system using a relay station.

It is another object of the present invention to provide a relay system and method for cellular communication, which can prevent performance deterioration due to a traffic load of an LB system by arranging a relay station supporting UB resources in a cell boundary area or a shadow area.

According to the present invention, there is provided a relay system in cellular communication wherein for a plurality of terminals requiring frequency resources for communication, an access node allocates resources of a licensed band allocated to a corresponding system in a frequency spectrum pool. The relay system includes at least one relay station, deployed in a cell boundary or a shadow area of the access node, for providing an access service for a base station with separate relay station frequency resources. The relay system includes a global spectrum coordinator for analyzing and managing usage of resources in the frequency spectrum pool, a first regional spectrum coordinator, installed in the base station, for analyzing and managing usage of resources of the licensed band, and a second regional spectrum coordinator, installed in the relay station, for analyzing and managing usage of resources of the unlicensed band. The first and second regional spectrum coordinators generate a licensed band available-resource list and an unlicensed band available-resource list, respectively, and transmit the available-resource lists to the global spectrum coordinator, and the global spectrum coordinator generates a global available-resource list based on the licensed band available-resource list and the unlicensed band available-resource list and transmits the global available-resource list to the base station and the relay station.

According to the present invention, there is provided a relay method in a cellular communication system including an access node for providing an access service using resources of a licensed band to a particular terminal among a plurality of terminals with a partial licensed band of the full frequency spectrum, and a relay station for relaying communication between the terminal and an access node. The relay method includes performing base station-led resource allocation on a licensed band for a terminal and a relay station located in a service area of the base station, and performing relay station-led resource allocation on the licensed band and an unlicensed band for a terminal located in a service area of the relay station.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF EXEMPLARY EMBODIMENTS

With reference to the accompanying drawings, a description will now be made of a relay system and method for cellular communication according to the present invention. Descriptions of well-known functions and constructions are omitted for the sake of clarity and conciseness.

Figure 1:
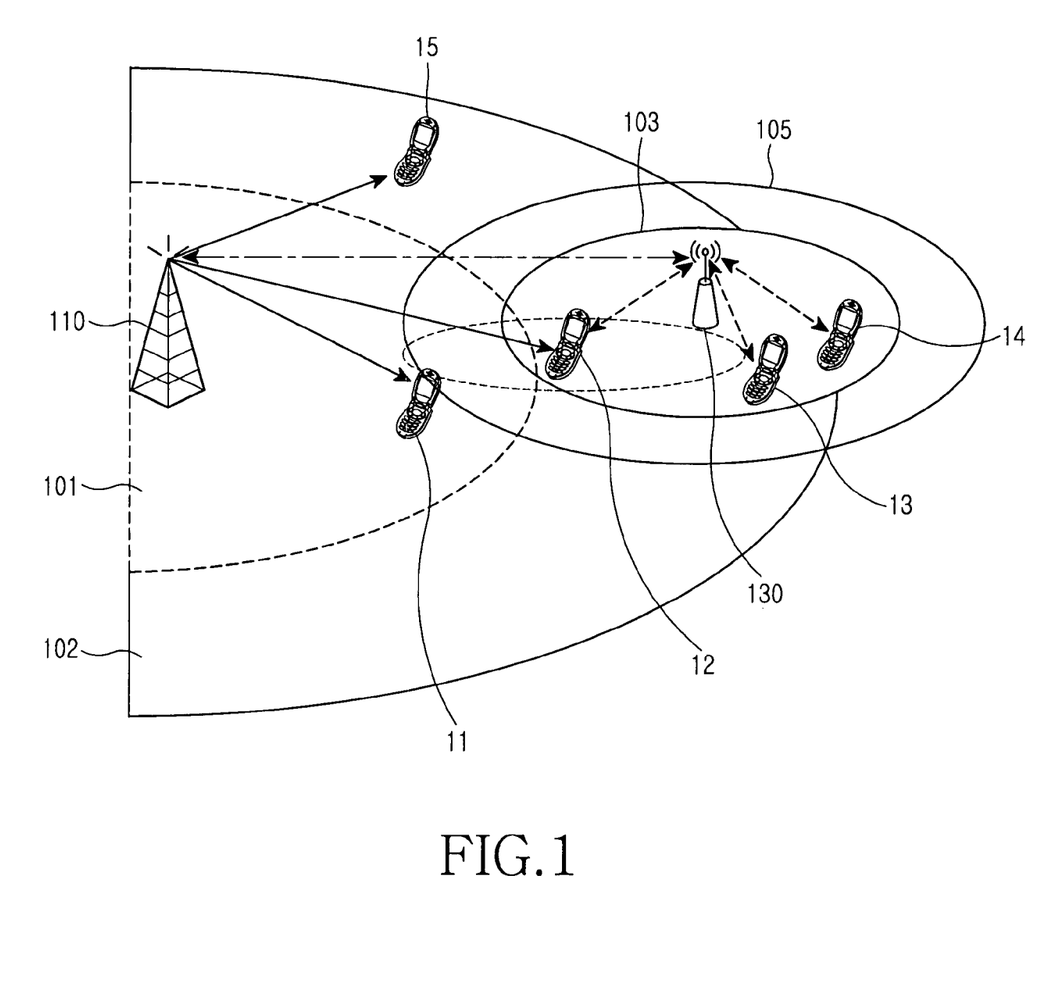
FIG. 1 is a diagram illustrating architecture of a relay system according to the present invention.

FIG. 1 is a diagram illustrating architecture of a relay system according to the present invention. In FIG. 1, a service area of a base station 110 that performs communication based on a licensed band (LB) is divided into a first LB service area 101 for low-rate mobility and high-rate data transmission service and a second LB service area 102 for high-rate mobility and low-rate data transmission service. The first LB service area 101 and the second LB service area 102 form their own concentric circles, centering about the base station 110, and the first LB service area 101 has a smaller radius than that of the second LB service area 102.

At least one relay station 130 is arranged in a boundary area or a shadow area of the base station 110, forming an unlicensed (UB) service area 103. The UB service area 103 is defined by transmission power of the farthest terminal desiring to communicate with the relay station 130. In addition, the relay station 130 employs an interference avoidance area having a greater radius than that of the UB service area 103 to avoid interference to its neighbor relay stations, and coverage of the interference avoidance area is defined by broadcasting a beacon frame with transmission power which is a selected amount higher than the transmission power for the UB service area 103.

If there is a plurality of neighbor relay stations, the relay station 130 scans UB spectrum channels for the neighbor relay stations to detect the usage of the UB spectrum, and can allocate channels not overlapping with the channels of the neighbor relay stations to its mobile stations.

Herein, the term "mobile station" refers to a variable-band transceiver communicable in various frequency bands, or a multi-mode multi-band terminal having various system interfaces.

Figure 2:
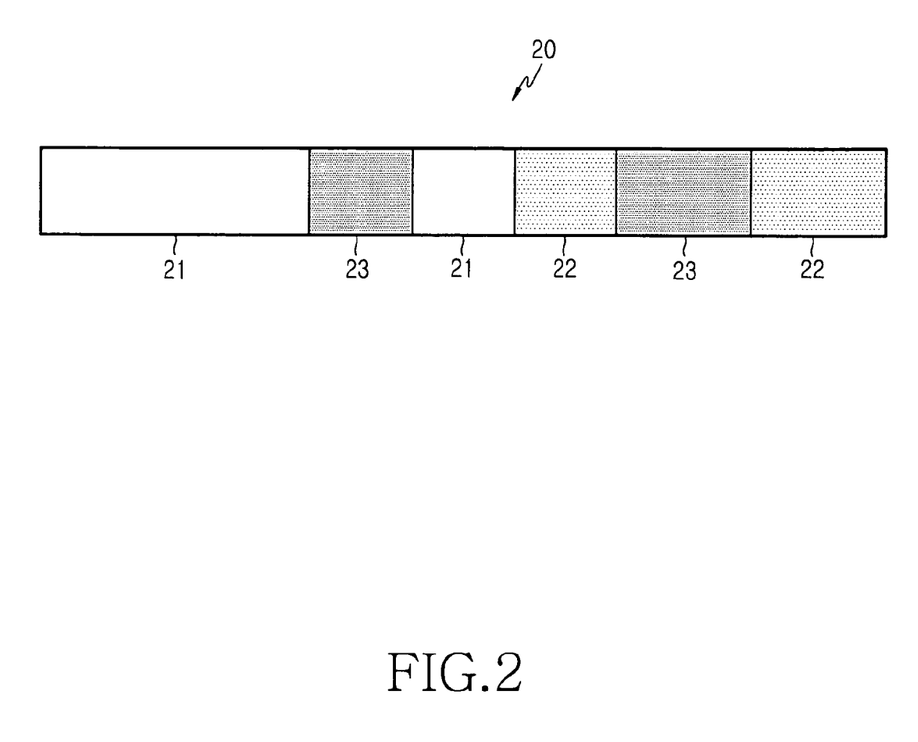
FIG. 2 is a diagram illustrating a frequency spectrum pool used in a relay system according to the present invention.

FIG. 2 is a diagram illustrating a frequency spectrum pool used in a relay system according to the present invention. A spectrum pool 20, which is an available system frequency band, includes LBs and UBs. The LBs are divided into dedicated LBs 21 allocated to mobile stations 11 located in the first LB service area 101 and shared LBs 22 occupied by the mobile stations located in the second LB service area 102 through contention. The UBs 23 are allocated to the mobile stations located in the UB service area 103 by the relay station 130.

For example, the mobile station 11 located in the first LB service area 101 is allocated resources of the dedicated LBs 21, the mobile station 15 located in the second LB service area 102 is allocated resources of the shared LBs 22, and the mobile stations 12, 13 and 14 located in the UB service area 103 are allocated resources of the UBs 23. The mobile stations 12 and 13 located in the UB service area 103 may be allocated the resources of the shared LBs 22 according to channel environment, because they are located even in the second LB service area 102.

In the present invention, the spectrum pool is divided into two LBs and one UB, and then allocated to mobile stations according to services. The number of LBs and UBs is subject to change according to the type and the number of systems deployed in a corresponding area, and to a resource management policy.

The relay system according to the present invention further includes global spectrum coordinators (not shown), which are upper network elements, and regional spectrum coordinators (not shown) which are installed in the base station 110 and the relay station 130. The global spectrum coordinator can be installed in a radio network controller (RNC) or an access point router (APR), or can be arranged as a separate network element.

The regional spectrum coordinator periodically detects (senses) channel environments of a frequency band used in a corresponding base station or relay station to update a regional available-resource list indicating information on the channels currently available in the corresponding station, and transmits the updated regional available-resource list to the global spectrum coordinator. The global spectrum coordinator analyzes the regional available-resource lists collected from the base station and the relay station to generate a global available-resource list, and broadcasts the generated global available-resource list to the base station and the relay station.

The regional available-resource list of the relay station can be transmitted to the global spectrum coordinator via the base station, or can be directly transmitted to the global spectrum coordinator over a separate channel. The global available-resource list can be transmitted to the relay station via the base station, or can be directly transmitted to the relay station over a separate channel. Also, the global spectrum coordinator can be installed in the base station. Alternatively, without the global spectrum coordinator, the relay station and the base station can directly exchange the regional available-resource lists with each other to manage the resources.

Figure 3:
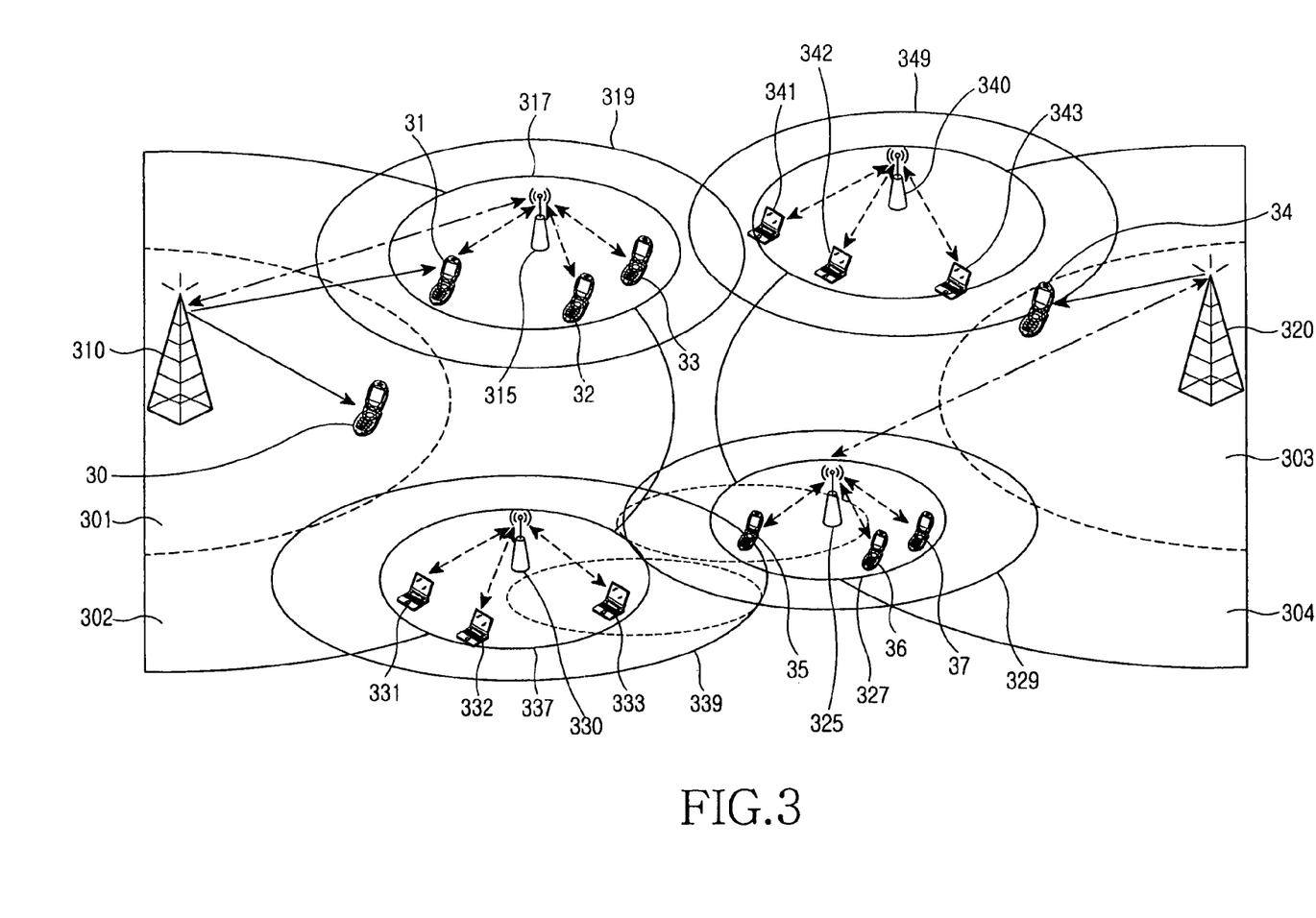
FIG. 3 is a diagram for a description of an operation performed in an environment in which a relay system according to the present invention and a WLAN system coexist.

FIG. 3 is a diagram for a description of an operation performed in an environment in which a relay system according to the present invention and a WLAN system coexist. The architecture of FIG. 3 includes a relay system centering about LB-based base stations 310 and 320 whose service areas and frequency spectra are extended by relay stations 317 and 327 supporting UB resources, and a WLAN system centering about UB-based access nodes 330 and 340.

In the cellular system, the base stations 310 and 320 have first LB service areas 301 and 303, and second LB service areas 302 and 304, respectively, and relay stations 315 and 325 have UB service areas 317 and 327, respectively. Mobile stations 30 and 34 located in the first LB service areas 301 and 303 are allocated dedicated LB resources 21 under the control of the base stations 310 and 320, and mobile stations 31, 32, 36 and 37 located in the overlapping areas between the second LB service areas 302 and 304 and the UB service areas 317 and 327 are selectively allocated shared LB resources 22 or UB resources 23 under the control of the relay stations 315 and 325 according to channel environments. Mobile stations 33 and 35 located in the non-overlapping areas between the second LB service areas 302 and 304 and the UB service areas 317 and 327 are allocated the UB resources 23 by the relay stations 315 and 325.

The WLAN access nodes 330 and 340 arranged in the overlapping areas between their service areas and the service areas of the base stations 310 and 320 allocate the UB resources 23 to the terminals 331, 332, 333, 341, 342 and 343 in the WLAN service areas 337 and 347 according to a WLAN standard. The access nodes 330 and 340 have Request-to-Send/Clear-to-Send (RTS/CTS) areas 339 and 349 for an RTS/CTS function, and the RTS/CTS areas 339 and 349 are determined by transmission power of an RTS frame from the farthest terminal 313 that can communicate with the access nodes 330 and 340. When broadcasting a CTS frame in response to the RTS frame, it is preferable for the access nodes 330 and 340 to broadcast the CTS frame with transmission power which is a selected amount higher than the reception power of the CTS frame.

When the relay stations of the relay system share the UB resources with the WLAN system, there is a need for a scheme for avoiding interference during communication between the relay stations and the mobile stations, and communication between the access nodes and the terminals.

To this end, the relay station of the relay system and the access node of the WLAN system sense the interference avoidance area of their neighbor relay stations and the RTS/CTS area of the access nodes (in other words, detect beacon frames broadcast from the relay stations and CTS frames broadcast from the access nodes), and allocate the channels which do not interfere with each other, or adjust transmission power for the same channel, thereby avoiding the interference.

Although the WLAN system is used as a counterpart network of the relay system in the present invention, any UB-based system can be applied to the present invention.

Figure 4:
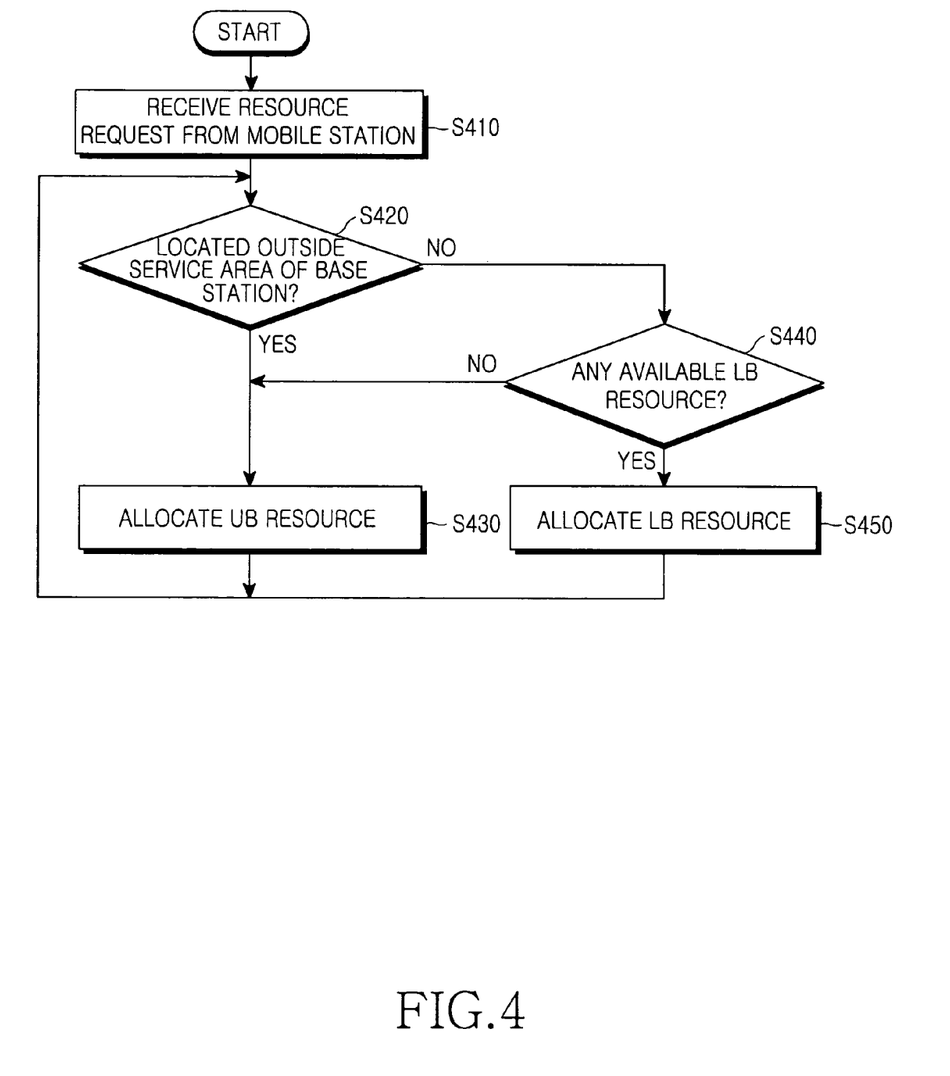
FIG. 4 is a flowchart illustrating a relay method according to the present invention.

FIG. 4 is a flowchart illustrating a relay method according to the present invention.

Referring to FIG. 4, upon receiving a resource request from a mobile station located in a UB service area controlled by a relay station 130 in step S410, the relay station 130 determines in step S420 whether the corresponding mobile station is located outside a service area of a base station 110. If the mobile station is located outside the service area of the base station 110, the relay station 130 enters a UB resource allocation mode in step S430. However, if the mobile station is located inside the service area of the base station 110, the relay station 130 determines in step S440 whether there is any available LB resource, based on a global available-resource list received from a global spectrum coordinator or an available LB resource list received from a base station. If it is determined that there is any available LB resource, the relay station 130 enters an LB resource allocation mode in step S450. Otherwise, the relay station 130 enters the UB resource allocation mode in step S430.

Figure 5:
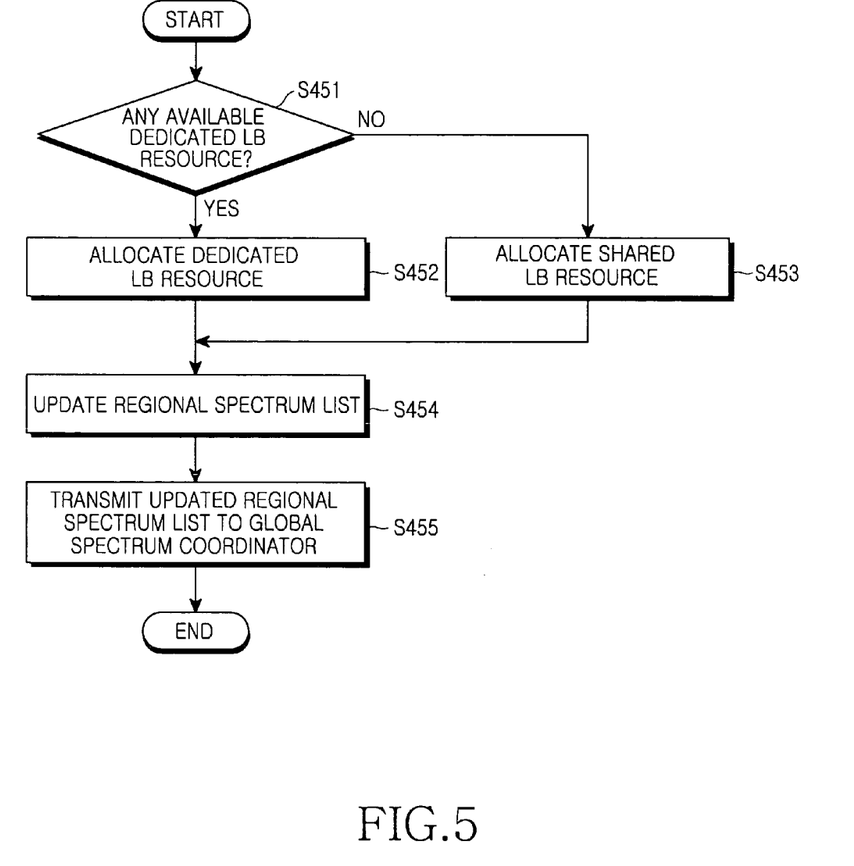
FIG. 5 is a detailed flowchart illustrating the LB resource allocation process of FIG. 4.

FIG. 5 is a detailed flowchart illustrating the LB resource allocation process S450 of FIG. 4.

Referring to FIG. 5, the relay station 130 determines in step S451 whether there is any dedicated LB resource, based on the global available-resource list or the available LB resource list. If there is any dedicated LB resource, the relay station 130 requests the base station 110 to allocate the dedicated LB resource to the corresponding mobile station in step S452. However, if there is no available dedicated LB resource, the relay station 130 allocates shared LB resources to the corresponding mobile station in step S453. After allocating the dedicated or shared LB resource, the relay station 130 updates a regional spectrum list (regional available-resource list) in step S454, and transmits the updated regional spectrum list to the global spectrum coordinator or a regional spectrum coordinator of the base station 110 in step S455. In other words, when both of the dedicated LB resource and the shared LB resource are available, the relay station 130 preferentially allocates the dedicated LB resource to the mobile station. When only one of the dedicated LB resource and the shared LB resource is available, the relay station 130 allocates the available resource to the mobile station.

Figure 6:
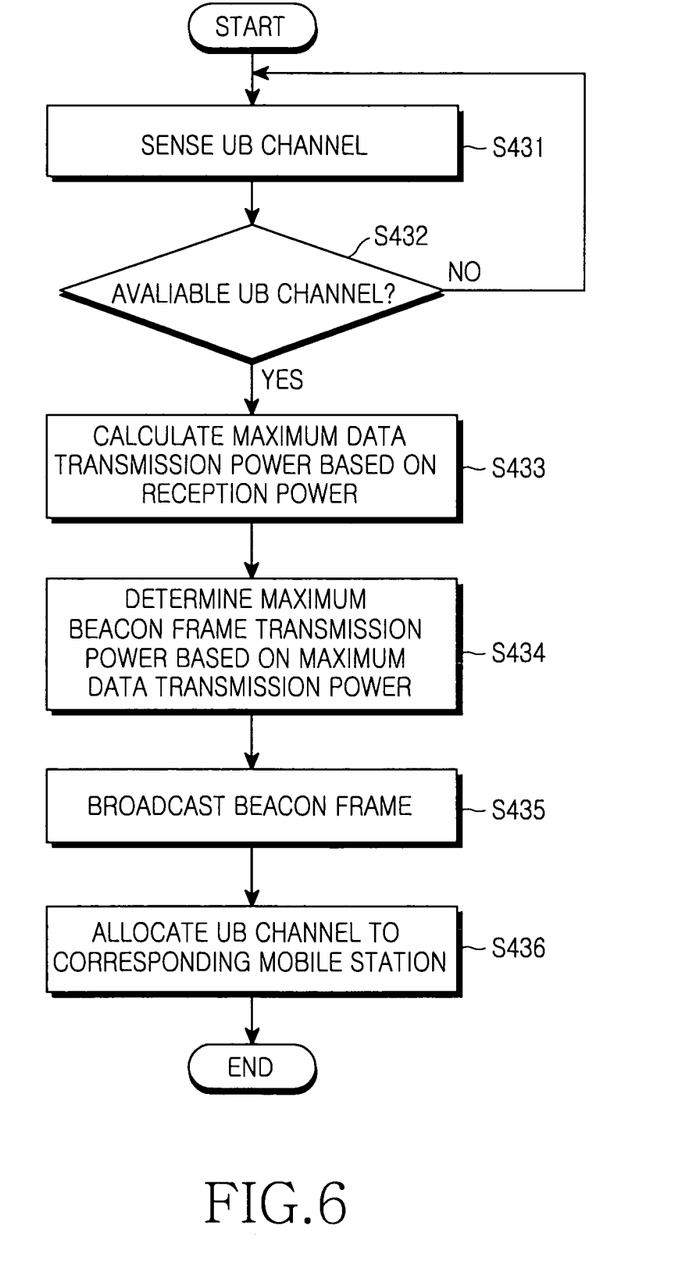
FIG. 6 is a detailed flowchart illustrating the UB resource allocation process of FIG. 4.

FIG. 6 is a detailed flowchart illustrating the UB resource allocation process S430 of FIG. 4.

Referring to FIG. 6, upon entry into the UB resource allocation mode, the relay station 130 senses a UB resource channel in step S431, and determines in step S432 whether the channel is in an idle state. If the UB resource is available, the relay station 130 calculates the maximum data transmission power P_data based on reception power from the mobile station in step S433, and determines the maximum beacon frame transmission power P_max using the maximum data transmission power P_data in step S434. If a UB service area 103 is determined by the maximum data transmission power P_data, an interference avoidance area 105 is determined by the maximum beacon frame transmission power P_max. After determining the maximum beacon frame transmission power P_max, the relay station 130 broadcasts a beacon frame with the maximum beacon frame transmission power P_max in response to the resource request signal received from the mobile station in step S435, and allocates the corresponding UB resource to the mobile station in step S436. Because the beacon frame includes a unique identifier (ID) of the relay station 130, the relay station 130 adjusts a size of the UB service area 103 according to whether there is any detected beacon frame from another relay station, and to the transmission power of the beacon frame, if any. In other words, upon receiving a beacon frame broadcast from another relay station, the relay station 130 avoids interference between the relay stations by reducing its own beacon frame transmission power P_max and data transmission power P_data to their minimum allowable levels. In addition, the relay station 130 can transmit information on a flag bit indicating priority in the beacon frame broadcast from another relay station to adjust levels of the beacon frame transmission power and the data transmission power, thereby avoiding the interference between the relay stations.

Although it is assumed in the present invention that several mobile stations occupy the same UB resource on a contention basis, if there is a plurality of relay stations deployed in one base station, it is also possible to reduce interference between relay stations by allowing the relay stations to employ different channels of the same UB resource.

In addition, when UB service areas of relay stations overlap each other, a mobile station can perform handoff between relay stations or between a relay station and a base station based on such parameters as required Quality-of-Service (QoS) and priority, and a received signal-to-interference-and-noise ratio (SINR).

Further, in an environment where wireless networks using UB resources such as the relay system and the WLAN system are deployed in an overlapping manner, a relay station can share UB resources with the corresponding wireless network.

Moreover, in the present invention, the UB service areas and the interference avoidance areas can be defined by RTS/CTS using a WLAN contention avoidance mechanism, and the interference avoidance areas are determined by CTS transmission power broadcast by the relay station.

As described above, the relay system according to the present invention deploys relay stations employing UB resources in cell boundaries or shadow areas of an LB-based base station, thereby extending the total service area and removing the shadow areas.

Further, the relay system according to the present invention decentralizes control for resource allocation by deploying relay stations in the cell boundaries of the LB-based base station, thus contributing to a reduction in control complexity of the base station and to the guarantee of traffic load balancing.

In addition, the relay system according to the present invention classifies LB resources into dedicated LB resources and shared LB resources, introduces UB resources, and defines allocation priorities of the resources, to allocate the optimal resources according to traffic environments, thereby contributing to efficient resource management and an increase in the system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A relay method in a cellular communication system comprising the steps of:
   providing an access service by an access node using resources of a licensed band to a particular terminal among a plurality of terminals with a partial licensed band of a full frequency spectrum;
   relaying communication by a relay station between the terminal and an access node;
   performing base station-led resource allocation on a licensed band for a terminal and a relay station located in a service area of the base station; and
   performing relay station-led resource allocation on an unlicensed band for a terminal located in a service area of the relay station.

2. The relay method of claim 1, wherein the relay station-led resource allocation step comprises:
   determining whether a terminal is located outside the service area of the base station upon receiving a resource request from the terminal; and
   allocating resources of the unlicensed band to the terminal, when the terminal is located outside the service area of the base station.

3. The relay method of claim 2, further comprising:
   determining whether there is any available resource in the licensed band when the terminal is located inside the service area of the base station;
   allocating the available resource in the licensed band when there is any available resource in the licensed band; and
   allocating resources of the unlicensed band when there is no available resource in the licensed band.

4. The relay method of claim 1, wherein the licensed band is divided into a dedicated licensed band for supporting low-rate mobility and high-rate data transmission service, and a shared licensed band for supporting high-rate mobility and low-rate data transmission service.

5. The relay method of claim 4, wherein the relay station-led resource allocation step comprises:
   determining whether a terminal is located outside the service area of the base station upon receiving a resource request from the terminal; and
   allocating resources of the unlicensed band to the terminal, when the terminal is located outside the service area of the base station.

6. The relay method of claim 5, wherein the relay station-led resource allocation step comprises:
   determining whether there is any available resource in the licensed band when the mobile station is located inside the service area of the base station;
   allocating resources of the licensed band when there is any available resource in the licensed band; and
   allocating resources of the unlicensed band when there is no available resource in the licensed band.

7. The relay method of claim 6, wherein the step of allocating resources of the licensed band comprises:
   determining whether there is any available resource in the dedicated licensed band;
   allocating the available resource of the dedicated licensed band when there is any available resource in the dedicated licensed band; and
   allocating resources of the shared licensed band when there is no available resource in the dedicated licensed band.

8. The relay method of claim 7, wherein the step of allocating resources of the licensed band comprises reporting information on the allocated resources to the system.

9. The relay method of claim 7, wherein the step of allocating resources of the shared licensed band comprises:
   monitoring a beacon frame in the shared licensed band from neighbor relay stations; and
   allocating resources of the shared licensed band based on priority of a flag bit in a detected beacon frame upon detecting the beacon frame from the neighbor relay stations.

10. The relay method of claim 6, wherein the step of allocating resources of the unlicensed band comprises:
    periodically sensing a channel in the unlicensed band to determine whether the channel in the unlicensed band is available;
    calculating maximum data transmission power based on reception power from the terminal when the channel in the unlicensed band is available;
    determining maximum beacon transmission power based on the maximum data transmission power;
    broadcasting a beacon frame with the determined maximum beacon transmission power; and
    allocating the channel in the unlicensed band to the terminal.

11. The relay method of claim 10, wherein the service area of the relay station is determined by the maximum data transmission power.

12. The relay method of claim 10, wherein the maximum beacon transmission power is calculated by multiplying the maximum data transmission power by a selected number.

13. The relay method of claim 10, wherein the step of allocating resources of the unlicensed band comprises:
    monitoring a beacon frame from neighbor relay stations; and
    adjusting the maximum data transmission power based on reception power of the detected beacon frame upon detecting a beacon frame from the neighbor relay stations.

14. The relay method of claim 1, further comprising performing relay station-led resource allocation on the licensed band for a terminal located in a service area of the relay station.

15. A relay apparatus for allocating resource in a cellular communication system comprising:
    an access node for providing an access service using resources of a licensed band to a particular terminal among a plurality of terminals with a partial licensed band of the full frequency spectrum;
    a base station for performing base station-led resource allocation on a licensed band for a terminal and a relay station located in a service area of the base station; and
    a relay station for relaying communication between the terminal and an access node by performing relay station-led resource allocation on an unlicensed band for a terminal located in a service area of the relay station.

16. The relay apparatus of claim 15, wherein the relay station performs relay station-led resource allocation on the licensed band for a terminal located in a service area of the relay station.

17. The relay apparatus of claim 15, wherein the relay station receives a resource request from a requesting terminal, determines whether the requesting terminal is located outside the service area of the base station, and allocates resources of the unlicensed band to the requesting terminal, if the requesting terminal is located outside the service area of the base station.

18. The relay apparatus of claim 15, wherein when the terminal is located inside the service area of the base station, the relay station determines whether there is any available resource in the licensed band, wherein when there is any available resource in the licensed band, the relay station allocates the available resource in the licensed band, and wherein when there is no available resource in the licensed band, the relay station allocates resources of the unlicensed band.

19. The relay apparatus of claim 15, wherein the licensed band is divided into a dedicated licensed band for supporting low-rate mobility and high-rate data transmission service, and a shared licensed band for supporting high-rate mobility and low-rate data transmission service.

20. The relay apparatus of claim 16, wherein the relay station determines whether there is any available resource in the dedicated licensed band, when there is any available resource in the dedicated licensed band, allocates the available resource of the dedicated licensed band, and wherein when there is no available resource in the dedicated licensed band, the relay station allocates resources of the shared licensed band.

21. The relay apparatus of claim 20, wherein the relay station reports information on the allocated resources to the system.

22. The relay apparatus of claim 20, wherein the relay station monitors a beacon frame in the shared licensed band from neighbor relay stations, detects a beacon frame from the neighbor relay stations, and allocates resources of the shared licensed band based on priority of a flag bit in the detected beacon frame.

23. The relay apparatus of claim 17, wherein allocating resources of the unlicensed band comprises:

periodically sensing a channel in the unlicensed band to determine whether the channel in the unlicensed band is available;

when the channel in the unlicensed band is available, calculating a maximum data transmission power based on reception power from the terminal;

determining maximum beacon transmission power based on the maximum data transmission power;

broadcasting a beacon frame with the determined maximum beacon transmission power; and allocating the channel in the unlicensed band to the terminal.

24. The relay apparatus of claim 22, wherein the service area of the relay station is determined by a maximum data transmission power.

25. The relay apparatus of claim 22, wherein a maximum beacon transmission power is calculated by multiplying a maximum data transmission power by a predetermined number.

26. The relay apparatus of claim 22, wherein the relay station monitors a beacon frame from neighbor relay stations, detects a beacon frame from the neighbor relay stations, and adjusts a maximum data transmission power based on a reception power of the detected beacon frame.

* * * * *